United States Patent [19]
McGuire et al.

[11] 4,038,792
[45] Aug. 2, 1977

[54] WEAR PROTECTOR FOR TRUCK DOCK DOOR SEAL

[75] Inventors: Winston B. McGuire; Stanley Makas, both of Hudson, N.Y.

[73] Assignee: W. B. McGuire Co., Inc., Hudson, N.Y.

[21] Appl. No.: 635,899

[22] Filed: Nov. 28, 1975

[51] Int. Cl.² .......................... E04B 1/92; A47B 95/00
[52] U.S. Cl. ................................. 52/105; 52/173 DS; 248/345.1
[58] Field of Search .......................... 52/105, 173 DS; 248/345.1; 49/462

[56] References Cited

U.S. PATENT DOCUMENTS

| | | | |
|---|---|---|---|
| 2,020,908 | 11/1935 | Scammell | 52/105 |
| 2,704,574 | 3/1955 | Etlar | 52/173 DS |
| 3,181,205 | 5/1965 | Frommelt et al. | 52/173 DS |
| 3,230,675 | 1/1966 | Frommelt et al. | 52/173 DS |
| 3,286,417 | 11/1966 | Dazzo | 52/173 DS |
| 3,338,542 | 8/1967 | Meinhard | 248/345.1 |
| 3,461,627 | 8/1969 | Conger | 52/173 DS |
| 3,500,599 | 3/1970 | Sciolino | 52/173 DS |

FOREIGN PATENT DOCUMENTS

| | | | |
|---|---|---|---|
| 557,609 | 11/1943 | United Kingdom | 52/724 |

*Primary Examiner*—James L. Ridgill, Jr.
*Attorney, Agent, or Firm*—Albert C. Johnston; Gerard F. Dunne

[57] ABSTRACT

Compressible foamed elastomer pads for sealing the ends of truck bodies at a dock door opening are shielded from wear by corners of the truck ends, by means of facing strips composed of a tough flexible sheet material, such as extruded polyvinyl chloride sheeting about ⅛ inch thick, which are hung loose over and cover substantially the entire length and width of the faces of said pads, have on their upper ends means holding them yieldably onto top portions of the pads, and are confined next to the pad faces yet kept displaceable relative thereto with motions of a truck body pressing against them.

5 Claims, 4 Drawing Figures

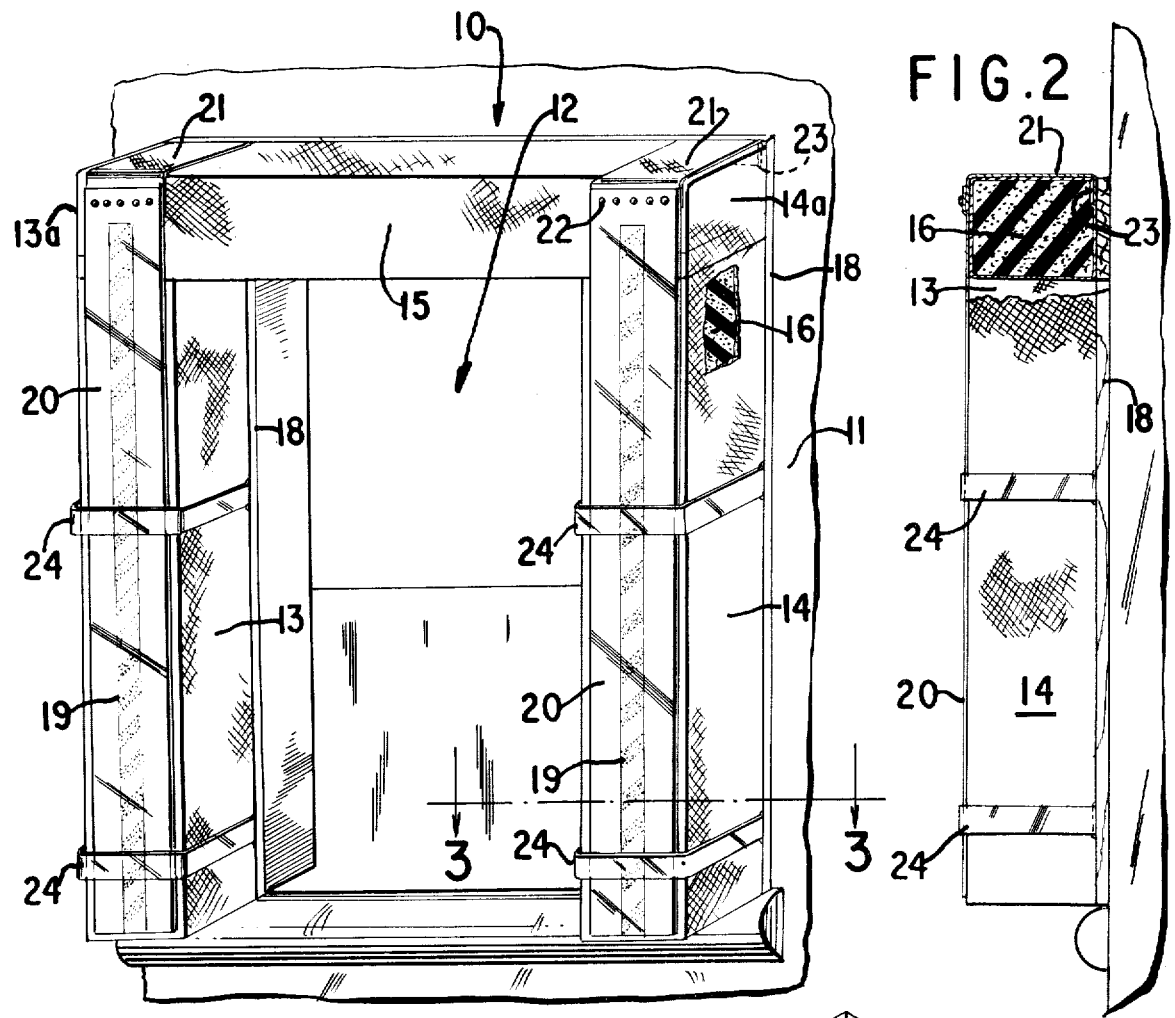
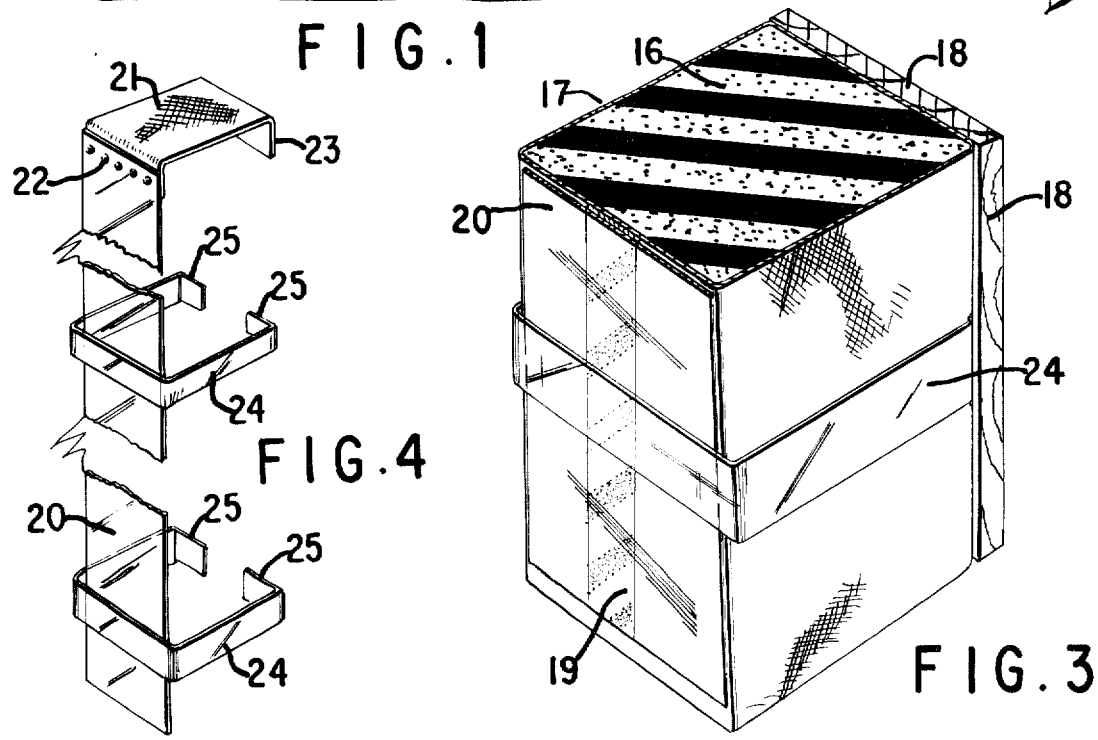

WEAR PROTECTOR FOR TRUCK DOCK DOOR SEAL

This invention relates to an improvement in truck dock door seals of the type presenting compressible pads arranged along the sides and over the top of a door opening, such as a warehouse door, to be engaged under pressure by the back end of a truck body docked at the door for loading or unloading. Such door seals shelter the loading passageway from outside weather conditions, and they often avoid costly losses of heated or refrigerated air.

More particularly, the invention relates to new and improved means for protecting the pads of such door seals against wear by the truck bodies pressed against them.

These pads typically are long molded blocks of a compressible foamed elastomeric material encased in a tough covering fabric. The foam blocks are mounted on backing boards which are fastened to the building wall along the opposite sides of and over the door opening. A guide stripe of contrasting color often is applied to the face of each side pad to aid drivers in backing trucks into proper sealing position.

When a truck end is backed into such a door seal, and also as the level of a docked truck body changes with changes of its weight during loading or unloading, the pads are subjected to severe stresses. These stresses produce wear which is particularly damaging in upper and lower regions of the side pads, where the often-rough back corners of over-the-road trailers strike and rub against the covering fabric.

A well-known expedient for limiting the damage consists in providing along each side pad a vertical array of overlapping, flexible, wear-resistant flaps or plates, resembling shingles, which are attached to the fabric covering the foamed elastomeric material by being stitched to it along their upper edges. See, for instance, U.S. Pat. No. 3,181,205. Such flaps, however, afford only limited protection, as they tend to concentrate stresses at the stitch lines attaching them to the fabric. Also, the fitting and stitching required for attaching them is costly, and it is impractical to provide them on a door seal already installed for use.

The purpose of the present invention is to provide a simpler, less costly, yet quite effective, means for protecting the door seal pads against damaging wear by truck bodies backed into sealing engagement with them, which means is, moreover, suitable for being mounted on a door seal either when or after it is installed for use.

According to the present invention, the pad along each side of the door opening is provided with a facing strip composed of a tough flexible sheet material which is hung loose over and substantially covers the length and width of the face of the pad and has on its upper end means holding it yieldably onto a top portion of the pad, and means are provided for confining the loose body of the strip next to the pad face while keeping it displaceable relative thereto with motions of a truck body pressed against the pad.

It has been found that, by virtue of the looseness and mobility of the tough flexible facing strips relative to the side pads and the yieldability of the means holding the upper end of each strip in place, the facing strips will readily distort and shift in position, and will effectively protect the pads against wear without themselves being damaged under the severe impacts, motions and pressures of truck bodies docked against the pads.

The sheet material forming each facing strip most advantageously is a tough, sheeted polymeric material, such as a polyvinyl chloride resin extruded to a sheet thickness of about ⅛ inch. The material preferably is transparent so that, although the facing strips cover substantially the entire faces of the side pad, the truck guide stripes commonly present on the pad faces are kept clearly visible through the strips to the driver of a truck being backed into the door seal.

Each facing strip can be easily mounted in place with its upper end held yieldably onto a top portion of the side pad, by means of a flexible flap fastened at one of its ends to an end of the facing strip and extending over the top of the pad to a backward portion thereof where the other end of the flap is fastened in place. In this way, whenever a pull is exerted on the strip by downward motion of a truck end being docked or being loaded in engagement with the pad, the pad may be pulled downward with corresponding elastic compression of a corner part of the pad top, letting the facing strip be displaced by the motion of the truck so that no damage to either the facing strip or its attachment will result.

The facing strip can be confined to a position next to the face of the pad by any of a variety of devices that will keep the strip loose so it is displaceable relative to the pad face with the motion of a truck body pressed against it. Advantageously, straps of a tough flexible sheet material are extended loose across and over the strip at intervals spaced apart along the pad, with end portions of these straps fastened to portions of the pad backward from its face. The strip confining straps may be bands made of the same polymeric material as the facing strips.

The above mentioned and other objects, features and advantage of the invention will be further evident from the following detailed description and the accompanying drawings of an illustrative embodiment thereof.

In the drawings:

FIG. 1 is a perspective view of a dock door seal provided with a wear protector according to the invention;

FIG. 2 is a side elevational view thereof;

FIG. 3 is an enlarged perspective view, taken along line 3—3 of FIG. 1, showing portions of a side pad and a facing strip thereon, with a strip confining strap in place; and FIG. 4 is a schematic perspective view showing the wear protector per se in its posture as installed for use.

A truck door seal 10 of well known form is shown in FIG. 1, as installed against a building wall 11 about a door opening 12 to seal rear end parts of a truck body, such as the end of an over-the-road trailer, when it is docked for loading or unloading at the opening, and an embodiment of the present wear protectors is shown installed on the seal pads at opposite sides of the door opening.

The door seal shown includes compressible side pads 13 and 14 fixed along the opposite sides and a compressible header pad 15 extending over the top of the door opening. Each of these pads is constituted by a long block 16 of a foamed elastomeric material encased in a tough covering fabric 17 (FIG. 3). The fabric may be, for exammple, a vinyl impregnated nylon of about 22 oz. to 40 oz. per square yard in weight. The covered blocks of elastomer foam are each mounted on a backing board 18 that will easily accommodate common fastening devices, such as nails, screws, staples or anchor bolts, and the backing boards are secured to the building wall to hold the pads securely in their proper location.

Bright, often yellow, vertical guide stripes 19 are provided centrally on the faces of the pads along the opposite sides of the door opening. The guide stripes aid drivers in backing the ends of trucks into a docked position in sealing engagement with the pads. A truck end so docked compresses and is sealed by the pads, so that the loading passageway between the truck body and the dock door is effectively sheltered from outside weather conditions. This often is important not only for workmen's comfort but also as a way to avoid costly losses of heated or refrigerated air.

In the illustrated door seal, the header pad 15 bridges the top of the door opening and has end portions 13a and 14a which in effect constitute top portions, or extensions, of the vertical side pads 13 and 14. Another common form of dock door seal has a header pad occupying the space between, and often made vertically adjustable relative to, the upper end portions of side pads that extend vertically over the full height of the seal structure. The wear protectors of the present invention are applicable similarly to either of these common forms of dock door seals.

According to the illustrated embodiment of the invention, the pads 13, 13a and 14, 14a along the sides of the door opening are each provided with a facing strip 20 composed of a tough, flexible sheet material, which is hung loose over and covers substantially the entire length and the width of the face of the pad. Each of these strips has on its upper end suitable means, which advantageously is a flexible connecting flap 21, by which the strip is held yieldably onto a top portion of the pad. Further, suitable means, such, for example, as flexible straps 24 extending loose across and over the facing strips at vertically spaced locations, are provided for confining each strip in proper working position next to its pad face yet keeping it loose so that it is displaceable relative thereto with motions of a truck body pressed against the strip and pad.

Facing strips composed of a clear polyvinyl chloride resin extruded into sheeting of about ⅛th inch in thickness are particularly effective for use according to the invention, due to the extreme toughness and durability, flexibility and surface smoothness of such sheeting. Its hardness, for instance, amounts to about 85 Durometer, rendering it exceedingly durable and tough; yet it still is quite flexible and pliant. Such an extruded PVC sheet material is known commercially. The sheeting is cut or otherwise formed into unitary strips 20 each of which, typically, has a width of about 12 inches and a length, for instance of about 9 feet, substantially corresponding to the height of the pads at either side of the dock door opening. Since the facing strips 20 are transparent, the guide stripes 19 on the pad faces are clearly visible through them to a driver of a truck being backed into the door seal.

The flexible connecting flap 21 on the upper end of each facing strip is formed advantageously of the same or a similar material as the covering fabric 17 of the seal pads; for instance, the flap material is a strong vinyl-impregnated nylon fabric of about 40 oz. per square yard in weight. One end of each flap 21 is fastened to an end margin of the facing strip 20, for instance by grommets 22, and the flap 21 is laid over the top of an upper side pad portion 13a or 14a and fastened at its other end to a backward portion thereof. For example, each flap 21 may be made about 12 inches wide and about 18 inches long, so that its width corresponds to that of the facing strip provided for a side pad about 12 inches square in cross section, and so that the flap will cover the top of the pad and present an end portion 23 to be fastened behind the top of the side pad between it and its backing board 18, as indicated in FIG. 2.

It will be noted that the connecting flap 21 extends from the upper end of the facing strip 20 over the top front corner and at least part of the top of the related side pad. Consequently, when a strong pulling force is exerted on the facing strip by a downward motion of a truck end being docked or being loaded in engagement with the door seal, the flap will be pulled downward with corresponding elastic deflection of corner portion of the pad top. This manner of yieldably holding the facing strip onto a top portion of the side pad enables the strip to be displaced by the motion of the truck body so that no demage will result to either the facing strip or its attachment. It will also be noted that the facing strips and their connecting flaps are free to be slid upwardly with upward motions of a truck end being docked or being unloaded in engagement with the side pads.

The flexible straps 24 are a preferred means among a variety of devices suitable for confining each of the facing strips 20 in working position yet keeping it loose over the face of the related side pad. In the illustrated embodiment, each of these straps is a band of the tough, transparent extruded polyvinyl chloride sheeting that is used for making the facing strips 20. As shown, there are two of the straps 24 for each facing strip, including one located near the lower end of the strip and another located approximately midway between the lower strap and the strip fastening flap 21. Each strap 24 extends loose across and over the outer surface of the facing strip so that it is free to be displaced with the facing strip under movements of a truck end docked against the door seal and each strap has end portions 25 which are fastened to backward portions of the side pad protected by the facing strip. For instance, the straps 24 are made about 4 inches wide and long enough to pass over the opposite sides of the side pad 13 or 14 and lap between it and its backing board, where the strap ends are secured to the backing board for suitable fasteners, e. g., staples.

The wear protective facing strips of the present invention can be easily installed in working position on the side pads of a dock door seal previously installed, as well as on a new door seal as it is being installed at a truck dock door.

We claim:

1. In a truck dock door seal including compressible pads arranged along the opposite sides and over the top of a door opening for sealing engagement by the back ends of truck bodies docked at said opening, the face of each of said side pads bearing a bright guide stripe, means for protecting the pads along said sides against wear by the truck bodies, comprising on each of said side pads a facing strip composed of a tough flexible transparent polymeric sheet material which is hung loose over and substantially covers the length and width of the face of the pad, said strip hanging free at its lower end and having fastened to its upper end a flexible strap extending from the strip over the top front corner and the top of the pad to a backing member thereof for holding the strip yieldably onto a top portion of the pad, and means including straps of tough flexible sheet material extending loose across and over said strip and over the opposite sides of the pad at intervals spaced apart along the pad, and having end portions fastened to a backing member of the pad, for confining said strip next to said face yet keeping it displaceable relative thereto with motion of a truck body pressed against the pad.

2. In a truck door seal including compressible pads arranged along the opposite sides and over the top of a door opening for sealing engagement by the back ends of truck bodies docked at said opening, the face of each of said side pads bearing a bright guide stripe, means for protecting the pads along said sides against wear by the truck bodies comprising on each of said side pads a facing strip formed of a transparent extruded polyvinyl chloride sheet material about ⅛th inch thick, said strip being hung loose over and substantially covering the length and width of the face of the pad, said strip hanging free at its lower end and having its upper end fixed in place on the top of the pad by a flexible flap fastened at one end thereof to said upper end, said flap extending over the top front corner and said top of the pad and being fastened at its other end to a backing member of the pad, and straps of the said material extending across and over said strip and over the opposite sides of the pad at intervals spaced apart along said pad and having end portions fastened to a backing member of the pad.

3. Means for protecting a compressible side pad of a truck dock door seal against wear by the back ends of trucks docked in engagement therewith, comprising a facing strip composed of tough flexible transparent polymeric sheet material adapted to be hung loose over and dimensioned to substantially cover the length and the width of the face of said pad, one end only of said strip having a flexible flap fastened thereto for holding said strip yieldably onto a top portion of the pad, said flap being adapted to extend over the top front corner and the top of said pad and be fastened to a backing member thereof, and straps of said sheet material dimensioned to extend loose across and over said strip and over the opposite sides of the pad at intervals spaced apart along said pad, and having end portions for attachment to a backing member of the pad, for confining said strip next to said face yet keeping the strip displaceable relative thereto with motion of a truck body pressed against the pad.

4. Means for protecting a compressible pad along a side of a truck dock door seal against wear by the back ends of truck bodies docked in sealing engagement therewith, comprising a transparent, wear resistant facing strip adapted to be hung loose over and dimensioned to substantially cover the length and width of the face of said pad, said strip being formed of a transparent extruded polyvinyl chloride sheet material about ⅛th inch thick, one end only of said strip having a flexible flap fastened thereto, said flap being dimensioned to extend over the top front corner and the top of said pad and be fastened to a backing member thereof for fixing said strip in place.

5. Wear protecting means according to claim 4, and transparent straps formed of said material for confining said strip next to said face yet keeping it freely displaceable relative thereto with motion of a truck body docked thereagainst, said straps being dimensioned to extend loose across and over said strip and over the opposite sides of said pad at intervals spaced apart along said pad and having end portions for attachment to a backing member of the pad.

* * * * *